(12) United States Patent
Panepucci et al.

(10) Patent No.: US 7,274,835 B2
(45) Date of Patent: Sep. 25, 2007

(54) OPTICAL WAVEGUIDE DISPLACEMENT SENSOR

(75) Inventors: Roberto R. Panepucci, Miami, FL (US); Bojan (Rob) Ilic, Ithaca, NY (US); Michal Lipson, Ithaca, NY (US); Vilson Rosa de Almeida, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 123 days.

(21) Appl. No.: 10/781,339

(22) Filed: Feb. 18, 2004

(65) Prior Publication Data

US 2005/0180678 A1    Aug. 18, 2005

(51) Int. Cl.
    *G02B 6/26* (2006.01)
(52) U.S. Cl. .......................................... 385/12; 385/13
(58) Field of Classification Search ...................... None
    See application file for complete search history.

(56) References Cited

U.S. PATENT DOCUMENTS

| | | | |
|---|---|---|---|
| 4,242,096 A | | 12/1980 | Oliveira et al. |
| 4,300,813 A | * | 11/1981 | Gravel .......................... 385/13 |
| 4,414,471 A | * | 11/1983 | Rines ..................... 250/227.14 |
| 4,855,255 A | * | 8/1989 | Goodhue ..................... 117/105 |
| 4,999,284 A | | 3/1991 | Ward et al. |
| 5,001,053 A | | 3/1991 | Takahashi et al. |
| 5,135,852 A | | 8/1992 | Ebersole et al. |
| 5,265,177 A | * | 11/1993 | Cho et al. ...................... 385/14 |
| 5,306,644 A | | 4/1994 | Myerholtz et al. |
| 5,420,688 A | * | 5/1995 | Farah ........................... 356/477 |
| 5,437,186 A | * | 8/1995 | Tschulena ................ 73/514.26 |
| 5,541,057 A | | 7/1996 | Bogart et al. |
| 5,550,063 A | | 8/1996 | Bogart |
| 5,658,732 A | | 8/1997 | Ebersole et al. |
| 5,705,399 A | | 1/1998 | Larue |
| 5,719,324 A | | 2/1998 | Thundat et al. |
| 5,756,279 A | | 5/1998 | Ebersole et al. |

(Continued)

FOREIGN PATENT DOCUMENTS

JP          9-203626 A    *    8/1997

(Continued)

OTHER PUBLICATIONS

S.T. Chu et al. An eight-channel add-drop filter using vertically coupled microring resonators over a cross grid. IEEE Photonics Technology Letters, vol. 11 No. 6, pp. 691-693, Jun. 1999.*

(Continued)

*Primary Examiner*—Sung Pak
*Assistant Examiner*—Mike Stahl
(74) *Attorney, Agent, or Firm*—Schwegman, Lundberg & Woessner, P.A.

(57) ABSTRACT

A substrate incorporates a mechanical cantilever resonator with passive integrated optics for motion detection. The resonator acts as a waveguide, and enables optical detection of deflection/displacement amplitude, including oscillations. In one embodiment, the cantilever comprises a silicon waveguide suspended over a substrate. A reflector structure faces a free end of the suspending cantilever, or a waveguide is supported facing the free end of the suspended cantilever to receive light transmitted through the silicon waveguide cantilever. Deflection/displacement of the cantilever results in modulation of the light received from its free end that is representative of the displacement. Ring resonators may be used to couple different wavelength light to the waveguides, allowing formation of an array of cantilevers.

30 Claims, 5 Drawing Sheets

U.S. PATENT DOCUMENTS

| | | | |
|---|---|---|---|
| 5,807,758 | A | 9/1998 | Lee et al. |
| 5,814,525 | A | 9/1998 | Renschler et al. |
| 5,838,870 | A * | 11/1998 | Soref .................... 385/131 |
| 5,945,280 | A | 8/1999 | Fawcett et al. |
| 6,016,686 | A | 1/2000 | Thundat |
| 6,124,765 | A | 9/2000 | Chan et al. |
| 6,203,983 | B1 | 3/2001 | Quate et al. |
| 6,263,736 | B1 * | 7/2001 | Thundat et al. .......... 73/514.36 |
| 6,436,647 | B1 | 8/2002 | Quate et al. |
| 6,525,307 | B1 * | 2/2003 | Evans et al. ........... 250/227.16 |
| 6,665,476 | B2 * | 12/2003 | Braun et al. .................. 385/50 |
| 6,721,053 | B1 * | 4/2004 | Maseeh ..................... 356/436 |
| 2003/0142597 | A1 * | 7/2003 | Park et al. ............ 369/44.23 |
| 2003/0154771 | A1 | 8/2003 | de Charmoy et al. |
| 2005/0018946 | A1 * | 1/2005 | Tran et al. ..................... 385/13 |
| 2005/0167508 | A1 * | 8/2005 | Syms et al. ................. 235/473 |

OTHER PUBLICATIONS

R. Muller et al. Technological processes and modeling of opto-electro-mechanical microstructures. Materials Science in Semiconductor Processing, vol. 3, pp. 427-431, Oct. 2000.*

A. V. Churenkov. Silicon micromechanical optical waveguide for sensing and modulation. Sensors and Actuators A, vol. 57, pp. 21-27, Oct. 1996.*

"1.2.1 Contact AFM", *A Practical Guide to Scanning Probe Microscopy, Chapter 1, Section 1.2.1*, Thermo Microscopes website: http://www.topometrix.com/spmguide/1-2-1.htm, (Observed Oct. 28, 2002), 3 pgs.

Baselt, D. R., et al., "A High-Sensitivity Micromachined Biosensor", *Proc. IEEE*, 85 (4), (1997),672-680 (Apr.).

Baselt, D. R., et al., "Biosensor Based on Force Microscope Technology", *J. Vac. Sci. Technol. B.*, 14 (2), (1996), 789-793.

Boyd, R. W., et al., "Sensitive Disk Resonator Photonic Biosensor", *Applied Optics*, 40(31), (2001),5742-5747 (Nov.).

Brecht, A., et al., "Optical Probes and Transducers", *Biosensors & Bioelectronics*, 10(9-10), (1995),923-936.

Carr, D., et al., "Fabrication of Nanoelectromechanical Systems in Single Crystal Silicon Using Silicon on Insulator Substrates and Electron Beam Lithography", *J. Vac. Sci. Technol. B.*, 15(6), (1997),2760-2763 (Nov.).

Carr, D. W., et al., "Measurement of Mechanical Resonance and Losses in Nanometer Scale Silicon Wires", *Applied Physics Letters*, 75(7), (1999), 920-922.

Carr, D., et al., "Measurement of Nanomechanical Rresonant Structures in Single-Crystal Silicon", *J. Vac. Sci. Technol. B*, 16(6), (1998), 3821-3824.

Fritz, J., et al., "Translating Biomolecular Recognition into Nanomechanics", *Science*, 288, (2000), 316-318 (Apr.).

Ilic, B., "Mechanical Resonant Immunospecific Biological Detector", *Applied Physics Letters*, 77(3), (2000), 450-452 (Jul.).

Ilic, B., et al., "Ultra-Sensitive Resonant Frequency Based Mass Detector", *Proc. Electrochem. Soc.*, (2000), 1 pg.

Kadar, Z., "Integrated Resonant Magnetic Field Sensor", http://www.xs4all.nl/~kadzsol/thesis/ch2/chap2.html, Philosophical Dissertation, Chapter 2, "Design Considerations",(1997), 21 pgs.

Lang, H., et al., "A Chemical Sensor Based on a Micromechanical Cantilever Array for the Identification of Gases and Vapors", *Applied Physics A*, 66, (1998), S61-S64.

Lang, H. P., et al., "Sequential Position Readout From Arrays of Micromechanical Cantilever Sensors", *Applied Physics Letters*, 72(3), (1998), 383-385 (Jan.).

Meyer, G., et al., "Novel Optical Approach to Atomic Force Microscopy", *Applied Physics Letters*, 53(12), (1988), 1045-1047 (Sep.).

Newell, W. E., "Miniaturization of Tuning Forks—Integrated Electronic Circuits Provide the Incentive and the Means for Orders-of-Magnitude Reduction in Size", *Science*, 161(3848), (1968), 1320-1326 (Sep.).

Petersen, K. E., "Silicon as a Mechanical Material", *Proceedings of the IEEE*, 70(5), (1982), 420-469 (May).

Sarid, D., *In: Scanning Force Microscopy With Applications to Electric, Magnetic and Atomic Forces*, Oxford University Press, New York, NY,(1994), 271 pgs.

Satoh, K., et al., "Effects of Various Thiol Molecules Added on Morphology of Dendrimer-Fold Nanocomposites", *Journal of Colloid and Interface Science*, 255, (2002),312-322.

Silverman, P. J., "The Intel Lithography Roadmap", *Intel® Technology Journal*, 6(2), (2002), 55-61.

Thundat, T., et al., "Detection of Mercury Vapor Using Resonating Microcantilevers", *Applied Physics Letters*, 66(13), (1995), 1695-1697 (Mar.).

Thundat, T., et al., "Thermal and Ambient-Induced Deflections of Scanning Force Microscope Cantilevers", *Applied Physics Letters*, 64(21), (1994), 2894-2896 (May).

* cited by examiner

Fig.5D

OPTICAL WAVEGUIDE DISPLACEMENT SENSOR

FIELD OF THE INVENTION

The present invention relates to displacement sensors, and in particular to an optical waveguide displacement sensor.

BACKGROUND OF THE INVENTION

Cantilever beams micro-machined in silicon are currently used as displacement sensors in such devices as atomic force microscopes, magnetic force microscopes and other force based scanning probe techniques where force applied to the cantilever causes a physical displacement that is detected. Cantilever beams are also used to sense vibrations of structures, inertial force, and to detect mass of the cantilever itself.

Cantilever displacement or deflection has been detected by several different methods. The methods include deflection of an external laser beam reflecting off of the cantilever, piezoresistive measurements, capacitance change between cantilever and substrate, and measurement of tunneling current. These methods suffer from various disadvantages relating to their use as sensitive mass sensors due to complex mounting requirements, lack of sensitivity, difficult fabrication, and environmental instability.

The ability to detect small amounts of materials, including pathogenic bacteria and biomolecules integral to cell responses, is important for life science research, drug discovery, medical diagnostics and for homeland security. Most current detection technologies are either, bulky, expensive or slow. Current instrumentation for single molecule detection is largely based upon direct optical measurements which provide a limited ability to interrogate an unknown molecule. Spectroscopic techniques such as ultraviolet, infrared (IR) and fluorescence all operate based upon the intrinsic spectral properties of the molecule alone or in combination with a label. The ability of these techniques to be informative is limited and this is especially true of molecules with a limited unique optical spectra and where there are a number of molecules in the milieu with similar spectral signatures.

Other methods of detecting biomolecules when attached to an antibody including those that might be a biowarfare agent, using integrated optics have been demonstrated recently. However, these depend on tight fabrication tolerances due to the efficient coupling and single wavelength operation of the sensing device, normally ring or disk resonators. Also, these techniques require expensive accessories, as single wavelength lasers are required and are tuned to the fabricated device.

SUMMARY OF THE INVENTION

A substrate incorporates a mechanical cantilever resonator with passive integrated optics for motion detection. The resonator acts as a waveguide, and enables optical detection of deflection/displacement amplitude, including oscillations. Ring resonators may be used to couple different wavelength light to the waveguides, allowing formation of an array of cantilevers.

In one embodiment, the cantilever comprises a silicon waveguide suspended over a substrate. A reflector structure faces a free end of the suspending cantilever, or a waveguide is supported facing the free end of the suspended cantilever to receive light transmitted through the silicon waveguide cantilever. Deflection/displacement of the cantilever results in modulation of the light received from its free end that is representative of the displacement.

Stress layers, such as a layer of silicon nitride may be formed on the waveguide and may be used to modulate the mechanical properties of the waveguide. Material may be trimmed from the waveguide to modify the resonant frequency of the waveguide. In one embodiment, the waveguide has a high index of refraction to highly confine light.

Highly-sensitive, immunospecific pathogens are attached to the cantilever resonators in one embodiment. In addition to detecting its presence, the mass of the pathogen is measured.

The cantilever resonators in one embodiment are a resonance-frequency-based biological mass sensor, comprised of a low-stress silicon nitride (bulk micromachined) as well as stress free poly-silicon (surface micromachined) cantilever beams. The cantilever beams are integrated with optical deflection, for the detection of molecules. In one embodiment, single *Escherichia coli* O157:H7 (*E. coli*)-cell-antibody binding events as well as selectively bound self assembled monolayers (SAMs) are detected.

A shift in the resonance frequency of a fundamental mode of the cantilever beam is measured as a function of the additional cell loading and correlated to the mass of the specifically bound additional mass. Out of plane vibrational oscillations of a free end of the cantilever beam at and near the fundamental resonance frequency may be detected using optical deflection and interferometric systems.

The cantilever resonators may be used in other applications, such as vibration sensing. Multiple such resonators are tuned to different resonant frequencies and used to detect selected vibrations of an aircraft or structure.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
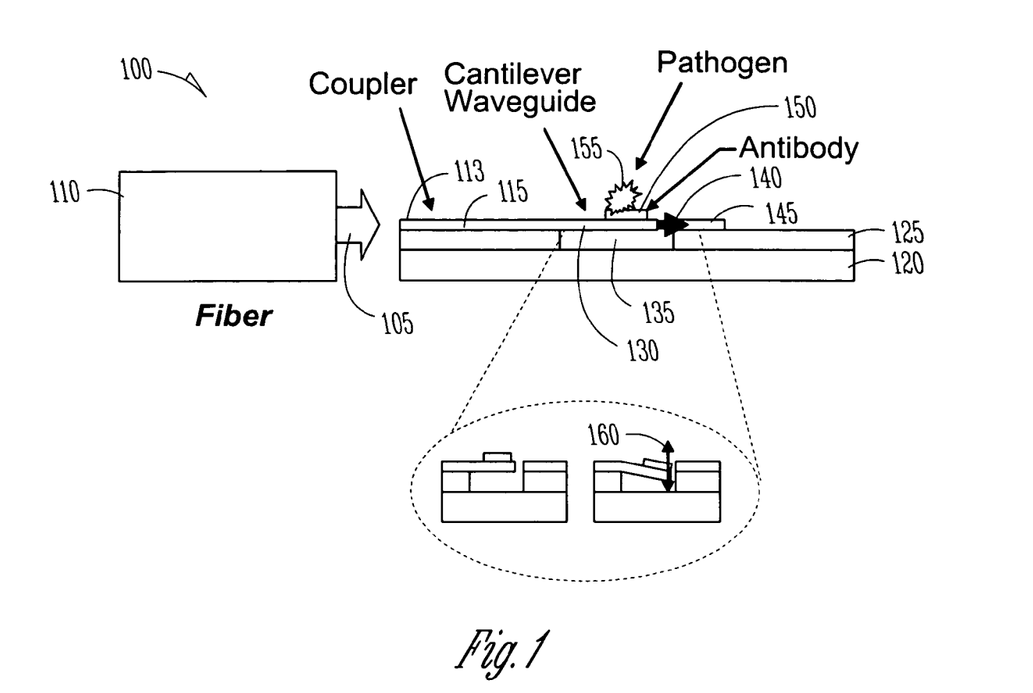
FIG. 1 is a block diagram representation of a waveguide cantilever beam sensor according to an embodiment of the invention.

A block diagram schematic of an analytical chip 100 is shown in FIG. 1. Light, represented by arrow 105 is provided by an optical fiber 110. The light 105 is provided via a coupler 113 to a silicon waveguide 115, that is supported by a substrate 120 and layer of oxide 125 formed on top of the substrate. The waveguide 115 is cantilevered at 130 over an opening in the oxide 125, indicated at 135, and is suspended over the substrate 120. Light travels through the cantilevered waveguide and is projected, as represented at 140 through a receiving structure 145. The receiving structure may be another waveguide that transmits received light to further analysis mechanisms, or may be a reflector that reflects received light back into the waveguide 115.

In one embodiment, the cantilevered waveguide 115 has an antibody 150 carefully placed a desired distance out onto the cantilevered portion 130 of the waveguide. The antibody attaches to a desired pathogen 155, adding to the mass of the cantilever, and thereby affecting its resonant frequency. In response to externally applied forces, the cantilever will deflect or oscillate as indicated in the cut-out at 160. The frequency of vibration of the cantilevered waveguide is measured, and the change from nominal is representative of the mass of the pathogen 155. It thus indicates that the pathogen is likely present in a sample that was put in contact with the antibody or antigen. The placement of the antibody affects the momentum of inertia of the cantilever, and should be done with care to ensure a desired moment is obtained.

In one embodiment, the waveguide is formed of silicon, polysilicon, silicon nitride, or any other optical conductor having a suitably high refractive index combined with desirable mechanical properties. The material should have mechanical properties that allow it to deflect under selected forces, and have a large enough displacement. A displacement that is linear with respect to force over a selected range is desired in some applications. A large dynamic range of motion may be obtainable.

The index of refraction of the material should be high enough in one embodiment to highly confine light. If the index is too low, the light may diverge quickly when exiting the waveguide. Less light will be received, and the changes in light received will also vary less with deflection of the waveguide, resulting in less sensitivity. In one embodiment, the receiving structure 145 is substantially fixed with respect to the substrate in order to avoid movement of it in response to forces used to activate the cantilever waveguide. This is done to minimize the changes in reception of light that might be caused by movement of the receiving structure.

In one embodiment, one or more stress layers are added to the waveguide to modify the displacement properties. A thin layer of silicon nitride may be added to the waveguide in one embodiment. Portions of the waveguide may be removed to fine tune the resonant frequency of the waveguide without adversely affecting the optical properties. A laser may be used to remove material from the surface of the waveguide in one embodiment.

In one embodiment, the waveguide is approximately 250 nm thick. The waveguide cantilevered portion extends approximately 6 um into the opening 135 of the oxide. The light emitting end of waveguide 115 is spaced approximately 100 nm from an end of the receiving structure 145.

Figure 2:
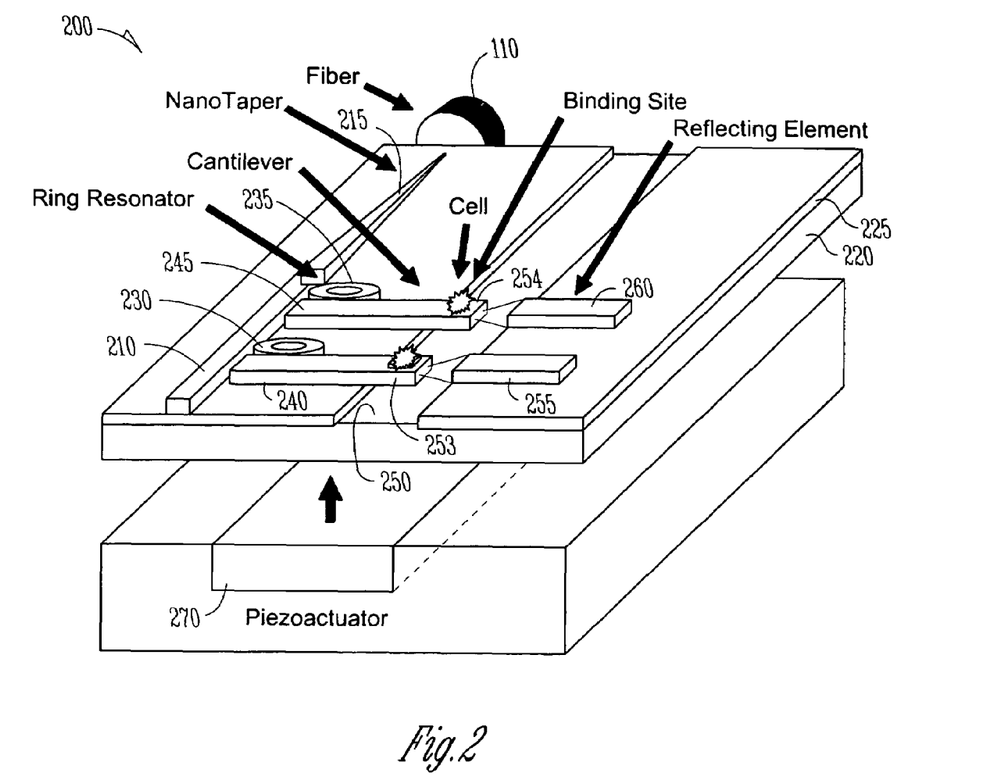
FIG. 2 is a block diagram of system incorporating multiple waveguide cantilever beam sensors according to an embodiment of the invention.

A further embodiment utilizing multiple waveguide cantilever beams is shown at system or analytical chip 200 in FIG. 2. Optical fiber 110 is coupled to a waveguide 210 via a tapered portion 215 of the waveguide 210. The taper is a nano-taper corresponding to the shortest SOI-based mode-size converter with high coupling efficiency for bridging between optical structures across scales. Other methods of coupling the optical fiber to the waveguide 210 may be used. Waveguide 210 is supported on a substrate 220 with an oxide layer 225 formed thereon.

Ring oscillators 235 and 240 are positioned adjacent the waveguide 210 and adjacent orthogonal waveguides 240 and 245 respectively to couple light of selected frequencies between the waveguides. Waveguides 240 and 245 extend along the oxide layer to a gap 250 in the oxide layer where they are suspended over the substrate 220 a desired distance at 253 and 254 as in FIG. 1 to form suspended or cantilevered portions. Binding sites may be formed on the suspended portions for biological or chemical detection type applications if desired. Reflecting elements 255 and 260 are positioned facing ends of the waveguides 240, 245 to receive and/or reflect light from them. In still further embodiments, reflectors may reflect light to yet further waveguides.

Although oscillation of the cantilevered portions of the waveguides is present at all times due to thermal motion, the amplitude of the oscillations is greatly enhanced by direct drive of the chip either through on-chip electrostatic actuation or through piezoelectric driving as provided by piezoactuator 270 positioned below substrate 220 in one embodiment. The piezoactuator 270 may be positioned above the substrate 220 in further embodiments, and is coupled to the substrate to impart motion to the substrate in a manner that enhances the oscillations of the cantilevered portions of the waveguides.

Externally actuating the cantilever provides an increase in sensitivity until non-linearities begin to disturb the oscillation. For instance, piezo drive will indeed slightly degrade the quality factor (Q), and if significant drive is employed the resonance curve will topple over. Drive amplitudes are selected to ensure the quality factor is not significantly degraded (less than 5% drop in Q).

Suitable stress layers in the cantilever waveguides are provided in one embodiment to displace the equilibrium position, such as by 100-200 nm. This places the operation at the inflexion curve, increasing the sensitivity. An oscillating amplitude of 20 nm in one embodiment yields a very large modulation of 10% in the intensity of the signal. Signals 10-100 times smaller than this may be measured. A conservative estimate of the detection limits of the oscillation of the cantilever can be achieved through a simple calculation. Given a 10 dbm input laser signal. If a lower bound of −10 db coupling (misalignment of 4 µm in nano-taper embodiment) is used, this means that a 0 dbm signal will reach the cantilever (or 1 mW). If another 40% in coupling is lost, and a 1% modulation due to oscillation is achieved, a 50 µW optical signal modulated at 1 MHz should be easily detected.

In chip 200, light from and to the chip is carried to a measurement system through an optical fiber. The piezoelectric transducer to excite mechanical vibrations of the micro-mechanical cantilevers that perform the biosensing inside the chip. The nano-taper input coupler 215 leads to the main waveguide 210 that distributes the optical signal. The ring resonators 230, 235 coupled to the main waveguide extract only a specific wavelength. The cantilevered waveguides 240 and 245 extract the optical signal from the ring resonators, and carry them to the cantilever portion of waveguides which are suspended and free to oscillate. The cantilever portions of the waveguides have a sensitized region on a top part to which pathogens can bind. This extra mass at the tip of this cantilever causes a change of its natural oscillation frequency. In one embodiment, the reflecting elements 255, 260 are placed opposite to the waveguides. Alternative the signal can be collected by a receiving waveguide.

Operation of the chip as a sensor requires that initially the chip containing the cantilever, with a bio-sensitive site at its tip, be exposed to the medium containing the target. The target then binds to the cantilever and is permanently attached. The chip is then dried if a liquid medium is used, and measurements are taken.

Optical power at different wavelengths is coupled from the fiber to the waveguides on chip. Light then propagates until it reaches the ring resonator tuned to its wavelength. Light is then transferred to the waveguide leading to the suspended section of the silicon waveguide that acts as a cantilever. At this point light exits the end of the cantilever and diffracts into free-space. A portion of this light is reflected back into the cantilever waveguide. The amount of light reflected back into the receiving waveguide depends strongly on the vertical deflection of the cantilever.

The light coupled back into the waveguide has encoded in it, a modulation in intensity due to the mechanical oscillation of the cantilever. This light is coupled back through the ring resonator into the input waveguide, and exits at the edge of the chip through the nano-taper coupler into the fiber. The intensity of each optical wavelength is modulated by the oscillation of its respective cantilever. The optical signals reflected back into the fiber are carried by the fiber to a simple spectrometer that measures the oscillating signal of each cantilever. Because the ring resonator acts as a filter in and of itself, the input signal can be spectrally broad. Changes in temperature will not affect the device, as they do in other schemes that use rings and discs as active sensing area.

The piezoelectric actuator increases the intensity of the cantilever oscillation during successive frequency scans to optimize sensitivity and then the resonance frequency is determined with the mass being given by the shift in frequency. The change in mass due to the attachment of the target is determined by: $dm/m = -2 \, df/f$. For measurements in vacuum this of the order of $10^3$. This translates into a mass sensitivity range of attograms to picograms for the cantilevers that can currently be manufactured. As fabrication process improvements occur, smaller and more precise systems may be built.

Coupling to and from optical fibers to devices such as the analytical chip 200 usually involves high losses due to mode-size and effective index mismatch. The nano-taper allows this to be done in a very simple fashion and with very high coupling efficiency. The nano-taper consists of a waveguide laterally tapered to a nanometer-sized tip at the facet in contact with the optical fiber. At the tip, the field profile becomes delocalized from the waveguide core, which induces a very large mode profile similar in effective index and profile to that of the fiber. FDTD and BPM simulations show that insertion loss can be as low as 0.5 dB for TE-like mode at $\lambda_0 = 1550$ nm, this is a factor of 20 times over conventional techniques. The coupling enhancement due to the presence of the nano-taper may be eight times over straight coupling to the waveguide. This was measured for both TM and TE-like modes, over the 1520-1620 nm range. The insertion loss of the nano-taper at $\lambda_0 = 1550$ nm is estimated to be $3.3 \pm 0.3$ and $6.0 \pm 0.4$ dB for TM and TE-like modes, respectively.

The problem of extracting the signal from the receiving waveguide is reduced since large area photodetectors butt-coupled to the chip with a coupler may be used. The high confinement Si-waveguides allows 90 degree bends in the chip's passive integrated optical circuit eliminating direct coupling of laser source to the detector, simplifying design of the chip-carrier and analytical chip 200. The nano-taper corresponds to the shortest SOI-based mode-size converter with high coupling efficiency for bridging between optical structures across scales. The alignment accuracy needed for 3 dB coupling is approximately +/−2 μm.

Figure 3:
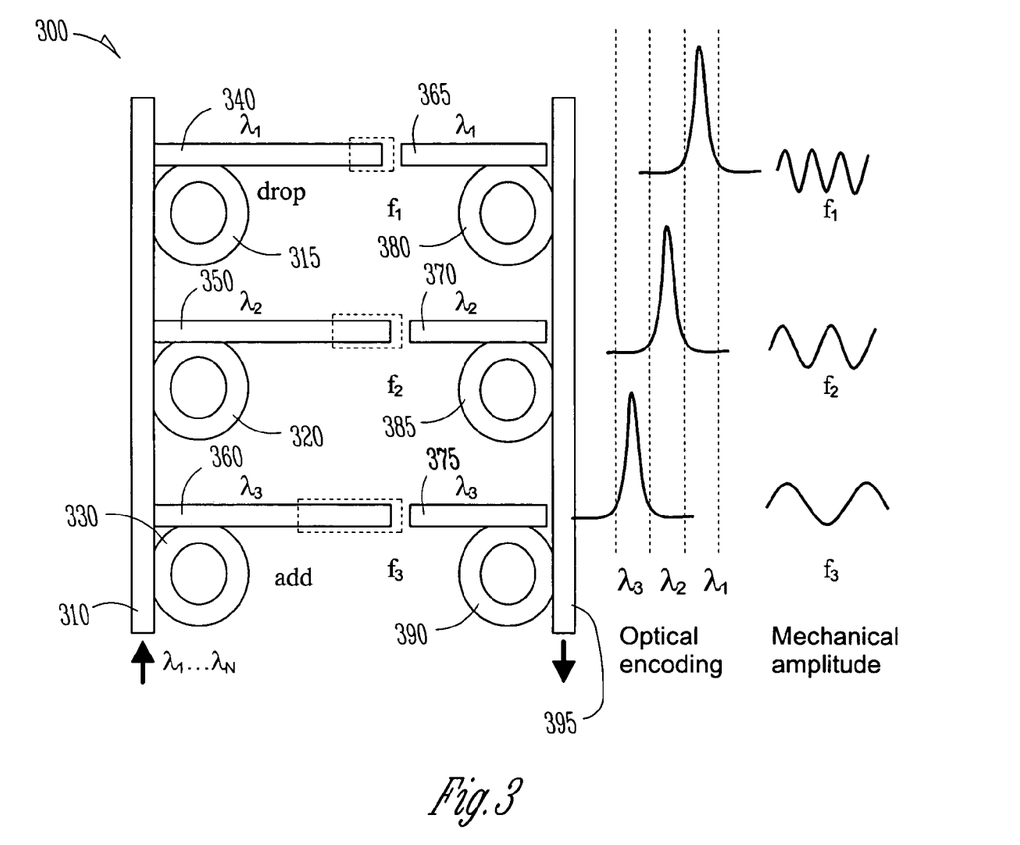
FIG. 3 is a block diagram representation of an array of waveguide cantilever beam sensors in transmission mode according to an embodiment of the invention.
Figure 4:
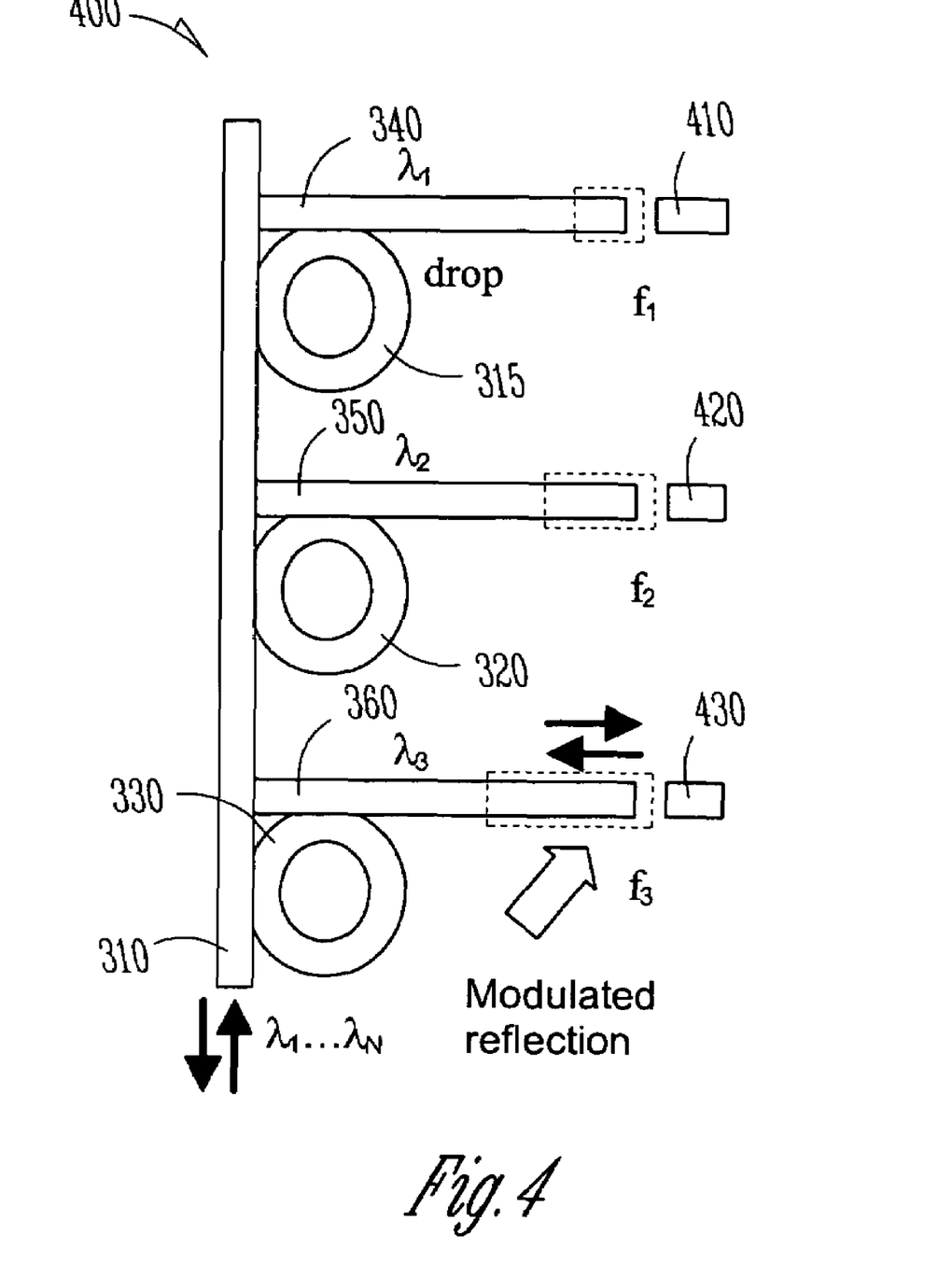
FIG. 4 is a block diagram representation of an array of waveguide cantilever beam sensors in reflection mode according to an embodiment of the invention.

FIGS. 3 and 4 show block schematic diagrams of wavelength encoded probing array architectures based on ring resonator structures at 300 and 400 respectively. In FIG. 3, light of several different wavelengths, $\lambda_1 \ldots \lambda_N$, are provided to a waveguide 310, such as in FIG. 2. Optical ring resonators 315, 320 and 330 are positioned adjacent or proximate waveguide 310 such that they are optically coupled. Cantilevered waveguides 340, 350 and 360 are optically coupled to respective optical ring resonators. The optical ring resonators are each are tuned to a desired wavelength $\lambda_1$, $\lambda_2$, and $\lambda_3$ such that those wavelengths are independently transmitted on corresponding cantilevered waveguides 340, 350 and 360.

Transmission of the optical signal from the cantilever waveguide to corresponding receiving waveguides 365, 370 and 375 is modulated. The transmitted signal is coupled into the receiving waveguides through corresponding matched ring resonators 380, 385 and 390. Y-junctions may also be used, but would induce a 50% loss per junction, restricting the array size. The coupled transmitted signal is coupled to an output waveguide 395.

The array may be used on a surface to detect vibrations at different frequencies. In one embodiment, each resonator is tuned to a different resonant frequency that may be indicative of adverse vibrations that might be exhibited by a structure, such as an airplane, engine, bearing, etc. Many different applications may benefit from mounting such an array in a position to detect undesirable vibrations. It may also be used to detect desirable vibrations to ensure a device is operating within specifications.

FIG. 4 shows an array 400 similar to array 300, where reflectors 410, 420 and 430 are positioned facing the cantilevered waveguides 340, 350 and 360 to provide modulated reflection. Only one I/O fiber is needed to send and receive optical signals. From a fabrication point of view, since the same ring resonator is used for extraction and re-insertion of the optical signal, devices do not need to be tuned. This greatly increases the yield and decreases cost.

Spectral separation of wavelengths is accomplished in both FIG. 3 and FIG. 4 by using different ring resonators of different diameters. Different frequencies of oscillation of the cantilevers is obtained by using different suspended lengths. For distinguishing signals resulting from the different cantilevers, the cantilever length does not need to be varied. The information from each cantilever is encoded in the optical wavelength.

Different cantilever lengths may be used to optimize the sensitivity to different pathogen or target masses. A frequency shift which indicates positive detection can be extracted for each separate wavelength. From a fabrication point of view, since the same ring resonator is used for extraction and re-insertion of the optical signal, devices do not need to be tuned. This greatly increases the yield and decreases cost.

A dendrimer-based chemistry may be used to enhance biomolecular immobilization for the targets coupled to the cantilevered waveguides. Dendrimers are star-like in appearance and have been used to increase the active surface area for immobilization. As with the Ni-NTA chemistry, the dendrimer surface modification has demonstrated a large local binding capacity, low nonspecific binding, flexibility and long-term stability. In one embodiment, the dendrimer has been modified to present pendant biotin groups, thereby allowing for the immobilization of biotin-tagged molecules, with a streptavidin molecule. DNA-DNA hybridizations and other protein-protein systems using bis([sulfosuccinimidyl] suberate) (BS3) may also be used rather than biotin as a linking molecule from the dendrimer surface.

Figure 5A:
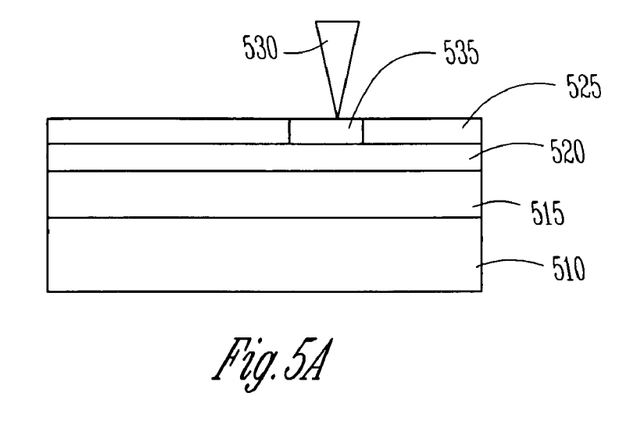
FIGS. 5A, 5B, 5C and 5D are a sequence of block diagrams representing formation of a waveguide cantilever beam sensor according to an embodiment of the invention.
Figure 5B:
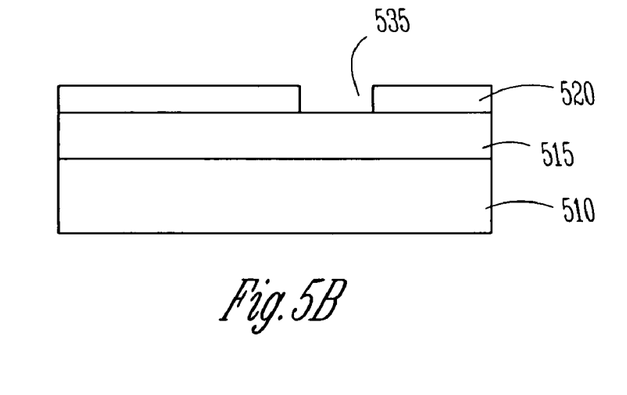

Microfabrication techniques available for fabrication of cantilevered waveguides are illustrated in FIGS. 5A, 5B, 5C and 5D. While the cantilevered waveguides may be produced using current technologies, dimensions in the 80-450 nm range are desired for optimal performance of the waveguides. Even smaller dimensions are likely to be available soon if not already, given the current pace of fabrication technology. FIG. 5A shows a cross section of a substrate 510 with oxide 515 formed on it. A waveguide 520 has been formed on the oxide, and a resist 525 has been patterned using electron-beam lithography 530 to define an opening 535 that will correspond to the gap between the cantilevered waveguide and the receiving waveguide portions of waveguide 520. The resist 525 has been removed in FIG. 5B.

Figure 5C:
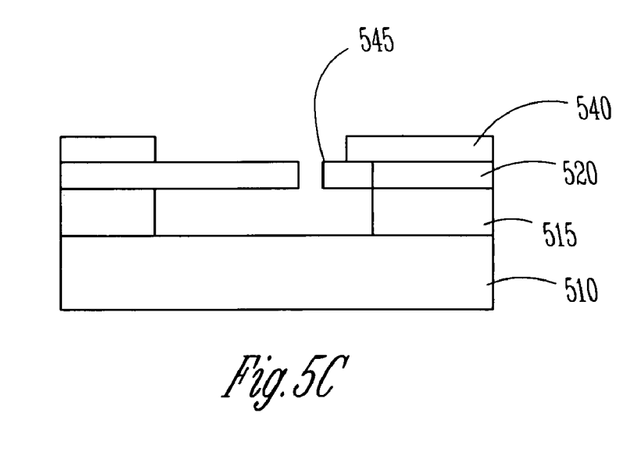
Figure 5D:
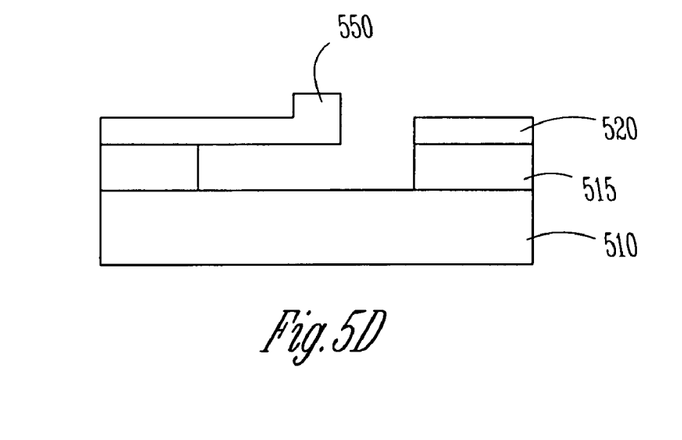

FIG. 5C illustrates the release of the cantilever portion of the waveguide. A mask layer 540 is used to define a portion of the oxide to be etched. The receiving waveguide is also protected by a portion of the mask layer indicated at 545 to make sure that the receiving waveguide will not be undercut, which might cause it to oscillate during operation. This is necessary as otherwise this may preclude a direct measurement of the cantilever's oscillating frequency, as the output will contain components from the oscillation of the receiving waveguide as well. FIG. 5D represents a released cantilever. The mask layers 540 and 540 are removed, and a biosensitive antibody 550 is optionally deposited on the cantilever at a desired position.

The fabrication of integrated optic structures, especially waveguides, in silicon is best accomplished with smooth sidewalls to achieve low loss. The smallest dimensions used in systems described herein are found in the nano-taper coupler and in the gap between the cantilever and receiving waveguide. Patterning of such features is accomplished using electron-beam lithography. Currently, site specific binding is achieved on cantilevers that undergo minimal processing for their fabrication. Additional processing steps needed to complete the chip should not interfere with this process, and should be fully compatible with that biochemistry.

CONCLUSION

The cantilever based system of the present invention provides a second dimension in the analytical resolution of a molecule; the accurate measurement of its weight. It may also be used for larger samples, such as bacteriophage, as well as for sensitive measurements of the mass of single molecules or their complexes. The cantilever technology may be more sensitive than mass spectrometry and may be used to provide mass information for noncovalently linked complexes. The technology will allow mass measurements on single complexes that are brought together by noncovalent linkages including van der Waals, hydrophobic and electrostatic interactions. Transcriptional complex formation such as those that involve the assembly of the heat shock complex may be monitored with these cantilever devices. Interactions between protein subunits of cell signaling complexes may be examined by tethering one member of the complex to the cantilever and allowing the other putative components to assemble.

The invention also allows the use of inexpensive broadband sources, since wavelengths may be selected in the chip. Sensors may also be formed to detect vibrations of structures to which they are attached. No binding site is needed in this type of use.

The invention allows all-optical monitoring of several chips due to it's inherent optical fiber based interconnection. The use of on-chip filters allows many chips to be interrogated by a single fiber linking many chips. Redundant fiber loops may be used to enhance reliability of the communication system.

The invention claimed is:

1. An optical sensor comprising:
a substrate having an opening;
a supply waveguide;
a cantilevered micro-mechanical waveguide having a first portion supported by the substrate and a second portion suspended over the opening in the substrate; and
a corresponding receiving structure positioned to receive light transmitted from an end of the second portion of the cantilevered micro-mechanical waveguide and
a ring resonator optically coupled between the cantilever waveguide and the supply waveguide.

2. The optical sensor of claim 1 wherein the receiving structure comprises a waveguide having an end facing the light transmitting end of the second portion of the cantilevered micro-mechanical waveguide.

3. The optical sensor of claim 1 wherein the receiving structure comprises a reflector facing the light transmitting end of the second portion of the cantilevered micro-mechanical waveguide.

4. The optical sensor of claim 3 wherein the reflector is supported by the substrate and reflects light back into the light transmitting end of the second portion of the cantilevered micro-mechanical waveguide.

5. The optical sensor of claim 1 and further comprising an optical fiber that supplies light to the supply waveguide.

6. The optical sensor of claim 5 wherein the supply waveguide comprises a nano-taper at a second end of the micro-mechanical waveguide that contacts a light emitting end of the optical fiber.

7. The optical sensor of claim 1 wherein the cantilever micro-mechanical waveguide comprises a selectively receptive substance attached to the second portion of the cantilever micro-mechanical waveguide a desired distance from the light transmitting end of the second portion of the cantilevered micro-mechanical waveguide.

8. The optical sensor of claim 7 wherein the cantilever micro-mechanical waveguide has a resonant frequency of oscillation that changes when something attaches to the selectively receptive substance.

9. The optical sensor of claim 8 wherein the selectively receptive substance is bio-receptive.

10. The optical sensor of claim 1 and further comprising a stress layer formed on the cantilevered micro-mechanical waveguide.

11. The optical sensor of claim 10 wherein the stress layer comprises silicon nitride.

12. An optical sensor comprising:
a substrate having an opening;
a supply waveguide;
a cantilevered waveguide having a first portion supported by the substrate and a second portion suspended over the opening in the substrate;

means for receiving light transmitted from an end of the second portion of the cantilevered waveguide;

a ring resonator optically coupled between the cantilever waveguide and the supply waveguide; and means for actuating the cantilevered waveguide.

13. The optical sensor of claim 12 wherein the means for actuating comprises a piezoactuator.

14. The optical sensor of claim 13 wherein the piezoactuator is positioned below the substrate.

15. The optical sensor of claim 12 wherein the means for actuating increases sensitivity of the cantilevered waveguide without significantly degrading a quality factor.

16. The optical sensor of claim 12 wherein the means for actuating comprises an electrostatic actuator.

17. An optical sensor comprising:
a substrate having an opening;
a supply waveguide;
multiple cantilevered waveguides having first portions supported by the substrate and second portions suspended over the opening in the substrate;
multiple corresponding receiving structures positioned to receive light transmitted from the ends of the second portion of the cantilevered waveguides; and
multiple ring resonators optically coupled between the cantilever waveguides and the supply waveguide.

18. The optical sensor of claim 17 wherein multiple ring resonators couple light of different wavelengths between the cantilever waveguides and the supply waveguide.

19. The optical sensor of claim 17 wherein the cantilevered waveguides have different resonant frequencies.

20. The optical sensor of claim 17 wherein the receiving structures comprise reflectors.

21. The optical sensor of claim 17 wherein the receiving structures comprise waveguides.

22. The optical sensor of claim 17 and further comprising:
a receiving waveguide;
multiple ring resonators optically coupled to the receiving structures and the receiving waveguide, wherein such multiple ring resonators are tuned to corresponding ring resonators optically coupled between the cantilever waveguides and the supply waveguide.

23. The optical sensor of claim 22 wherein the multiple ring resonators are tuned to desired wavelengths.

24. The optical sensor of claim 17 wherein the second portions of the cantilever waveguides are of different length.

25. The optical sensor of claim 17 and further comprising a stress layer formed on at least one of the cantilevered waveguides.

26. An optical sensor comprising:
a substrate having an opening;
a supply waveguide;
multiple cantilevered waveguides having first portions supported by the substrate and second portions suspended over the opening in the substrate;
means for receiving light transmitted from the end of the second portion of the cantilevered waveguides;
multiple ring resonators optically coupled between the cantilever waveguides and the supply waveguide; and
means for actuating the cantilevered waveguides.

27. A method comprising:
forming a selectively receptive site on a suspended end of a cantilever waveguide;
supplying light to the cantilever waveguide via a ring resonator; and
measuring light modulated by motion of the cantilever waveguide.

28. The method of claim 27 wherein the receptive site is bioreceptive.

29. The method of claim 28 and further comprising actuating the cantilever waveguide.

30. A method of sensing vibration, the method comprising:
supplying light to a cantilever micro-mechanical waveguide via a ring resonator;
coupling the cantilever micro-mechanical waveguide to a vibrating surface; and
measuring light modulated by motion of the cantilever micro-mechanical waveguide.

* * * * *